(12) United States Patent
Williams et al.

(10) Patent No.: US 7,273,352 B2
(45) Date of Patent: Sep. 25, 2007

(54) INLET PARTIAL BLADES FOR STRUCTURAL INTEGRITY AND PERFORMANCE

(75) Inventors: Morgan Williams, Resenda, CA (US); Wei-Chung Chen, Westlake Village, CA (US); Khanh C. Hoang, Van Nuys, CA (US); Jeff H. Miller, Simi Valley, CA (US)

(73) Assignee: United Technologies Corporation, Hartford, CT (US)

( * ) Notice: Subject to any disclaimer, the term of this patent is extended or adjusted under 35 U.S.C. 154(b) by 169 days.

(21) Appl. No.: 10/754,267

(22) Filed: Jan. 9, 2004

(65) Prior Publication Data

US 2005/0152779 A1    Jul. 14, 2005

(51) Int. Cl.
F04D 13/12    (2006.01)

(52) U.S. Cl. .............. 416/175; 416/201 R; 416/186 R; 416/198 A (58) Field of Classification Search ............. 415/173.6; 416/175, 186 R, 201 R, 198 A
See application file for complete search history.

(56) References Cited

U.S. PATENT DOCUMENTS

| | | | |
|---|---|---|---|
| 2,398,203 A | * | 4/1946 | Browne ...................... 416/188 |
| 2,482,462 A | * | 9/1949 | Browne .................. 416/186 R |
| 3,893,817 A | * | 7/1975 | Hackbarth et al. .......... 29/889.4 |
| 4,428,713 A | | 1/1984 | Coplin et al. |
| 4,428,717 A | * | 1/1984 | Catterfeld ............... 416/186 R |
| 4,448,573 A | | 5/1984 | Franz |
| 4,482,293 A | | 11/1984 | Perry |
| 4,502,837 A | | 3/1985 | Blair et al. |
| 4,627,233 A | | 12/1986 | Baran, Jr. |
| 4,722,183 A | | 2/1988 | Rosen |
| 4,912,925 A | | 4/1990 | Foust |
| 5,267,437 A | | 12/1993 | Foust |
| 5,385,442 A | | 1/1995 | Lehe et al. |
| 5,403,165 A | | 4/1995 | Lehe et al. |
| 5,404,715 A | | 4/1995 | Vuillamy et al. |
| 5,572,864 A | | 11/1996 | Jones |
| 5,619,851 A | | 4/1997 | Johnson et al. |
| 5,655,895 A | | 8/1997 | Warth et al. |
| 5,661,970 A | | 9/1997 | Muller et al. |
| 6,170,258 B1 | | 1/2001 | Katorgin et al. |
| 6,390,768 B1 | | 5/2002 | Muhs et al. |
| 6,431,828 B1 | | 8/2002 | Quinn |
| 6,505,463 B2 | | 1/2003 | Kruse et al. |
| 6,581,882 B2 | | 6/2003 | Valentian |
| 6,595,751 B1 | | 7/2003 | Straub et al. |
| 6,601,380 B2 | | 8/2003 | Knuth et al. |

* cited by examiner

Primary Examiner—Ninh H. Nguyen
(74) Attorney, Agent, or Firm—Kinney & Lange, P.A.

(57) ABSTRACT

Methods and apparatus for conveying fluids (e.g., liquids, gases, and mixtures thereof) are disclosed. A turbopump in accordance with an exemplary implementation of the present invention comprises an impeller defining at least one flow channel and a shroud defining an opening communicating with the at least one flow channel. In certain advantageous implementations, at least one inlet partial of the impeller extends into the opening defined by the shroud. The at least one inlet partial may advantageously be capable of supporting the opening in the shroud. In some cases, the impeller may include a plurality of these inlet partials.

30 Claims, 10 Drawing Sheets

INLET PARTIAL BLADES FOR STRUCTURAL INTEGRITY AND PERFORMANCE

FIELD OF THE INVENTION

The present invention relates generally to methods and apparatus for conveying fluids (e.g., liquids, gases, and mixtures thereof). More particularly, the present invention relates to pumps (e.g., pumps capable of providing propellant to a rocket engine).

BACKGROUND OF THE INVENTION

Today, turbopumps are used in a wide variety of applications. One example of such an application is rocket propulsion systems. Many rocket propulsion systems include turbopumps as part of a propellant feed system. Turbopumps may be used, for example, to convey various fluids (e.g., fuels and oxidizers) to a combustor of the rocket engine. Turbopumps consist of turbine and pump components. The pump typically increases these incoming fluids to a higher pressure.

The rotational seal is typically formed between a rotating portion of the pump (e.g., centrifugal pump impeller) and a stationary portion of the pump. High rotational speeds can cause the rotating member forming this seal to bow outwardly or scallop. One approach for restricting the amount of scalloping is to increase the thickness of the rotating member of the seal. Another approach, is to provide a larger seal clearance to accommodate the scalloping. However, the larger seal clearances tend to reduce the efficiency of the pump. In other words, pump impeller efficiency usually decreases with increases in seal clearances.

SUMMARY OF THE INVENTION

The present invention relates generally to methods and apparatus for conveying fluids. More particularly, the present invention relates to pumps (e.g., pumps capable of providing propellant to a rocket engine). An impeller in accordance with an exemplary embodiment of the present invention may advantageously include a plurality of inlet partials. The inlet partials may be positioned and dimensioned to reduce scalloping in a rotating seal member. When this is the case, strain in the rotating seal member is reduced. The likelihood that rubbing will occur between the rotating seal member and a stationary seal member is also reduced. Additionally, reduced scalloping allows for the use of relatively small seal clearances, thus boosting efficiency.

A turbopump in accordance with an exemplary implementation of the present invention comprises an impeller defining at least one flow channel and a shroud defining an opening communicating with the at least one flow channel. In certain advantageous implementations, at least one inlet partial of the impeller extends into the opening defined by the shroud. The at least one inlet partial may advantageously be capable of supporting the opening in the shroud. In some cases, the impeller may include a plurality of these inlet partials.

In one aspect of the present invention, the inlet partials are capable of precluding a change of shape in the opening during operation of a turbopump including the shroud. The inlet partials may, for example, be capable of providing supporting forces that are substantially equal and opposite to deformation forces acting on the shroud. The deformation forces may be, for example, centrifugal forces acting on the shroud during rotation of the shroud. The deformation forces may also be, for example, deformation forces produced by a working fluid passing through the at least one flow channel.

In some implementations, the opening is defined by an annular ring of the shroud. When this is the case, the at least one inlet partial may be capable of decreasing the radial deformation of the annular ring. In certain implementations, a second annular ring is disposed about the first annular ring so that a rotary seal is formed therebetween. A gap may, in some cases, be defined by the first annular ring and the second annular ring. The inlet partials supporting the first annular ring may be adapted so that the gap remains more constant when the first ring is rotating than would be the case if the first annular ring was not reinforced. The second annular ring may be formed by a pump casing in some implementations.

The opening defined by the shroud may have a first shape when the shroud is stationary and a second shape when the shroud is rotating at a working speed. In one aspect of the present invention, a difference between the first shape and the second shape is smaller than a difference in shape occurring when the shroud is not supported by the inlet partials. When this is the case, the first shape may have generally circular cross section.

In one aspect of the present invention, the inlet partials are capable of precluding a change in the shape of the opening during rotation of the shroud. For example, the inlet partials may be capable of preventing the opening from assuming a non-circular shape. A deflection of the shroud during rotation of the shroud is advantageously smaller than a deflection occurring when the shroud is not supported by the inlet partials. The presence of the inlet partials may also cause the second shape to be more circular than would be the case without the inlet partials.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
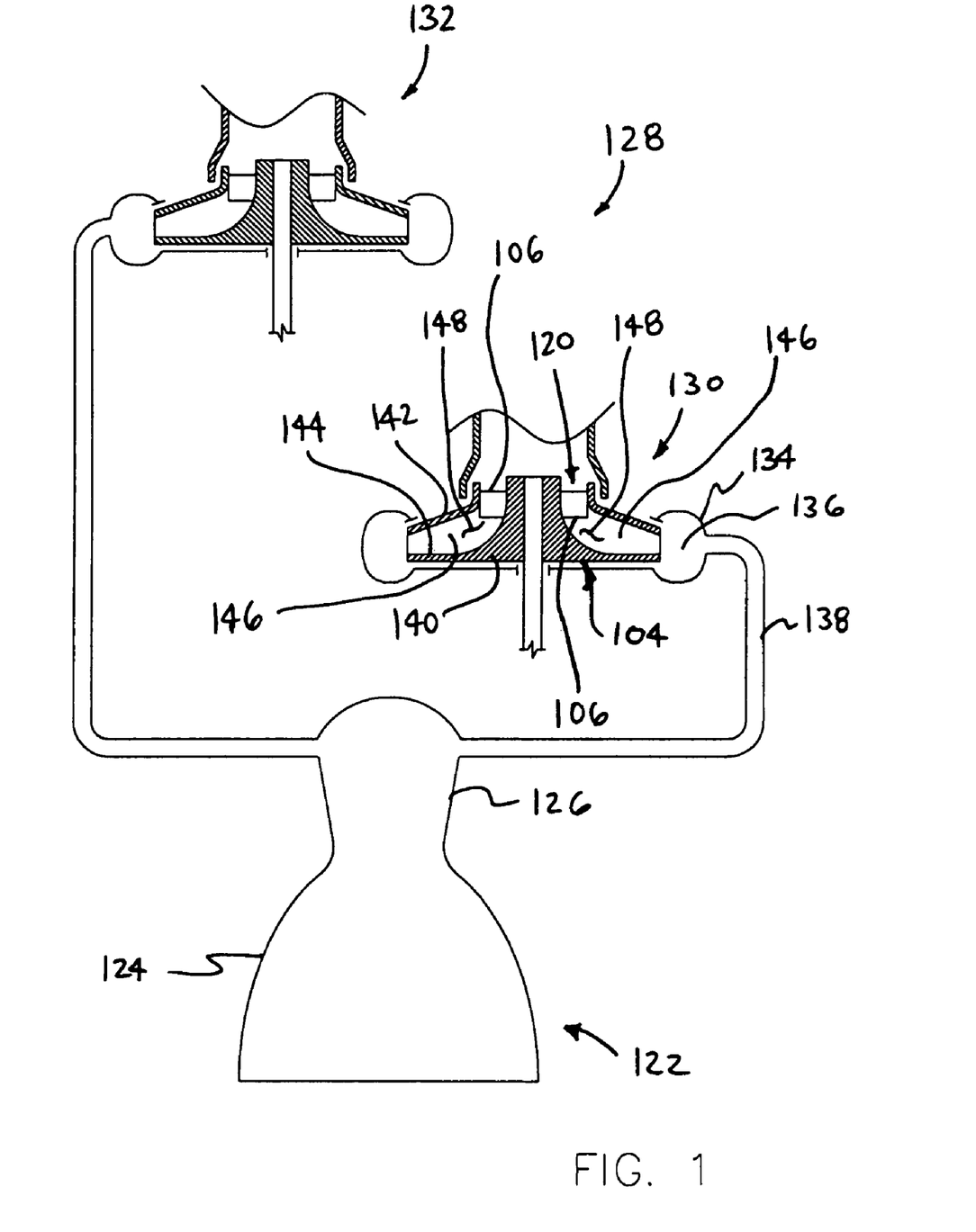
FIG. 1 is a simplified diagrammatic representation of a rocket engine.

FIG. 1 is a simplified diagrammatic representation of a rocket engine 122. Rocket engine 122 of FIG. 1 includes a nozzle 124, a combustor 126 and a propellant supply system 128. In the embodiment of FIG. 1, propellant supply system 128 includes a first turbopump 130 and a second turbopump 132 that both fluidly communicate with combustor 126 of rocket engine 122. During operation of rocket engine 122, first turbopump 130 and second turbopump 132 may provide fuel and oxidizer to combustor 126 of rocket engine 122.

First turbopump 130 comprises a casing 134 that is disposed about an impeller 104. Casing 134 defines a chamber 136 that fluidly communicates with combustor 126 via a conduit 138. In the embodiment of FIG. 1, impeller 104 comprises a body 140 and a shroud 142 overlaying a front face 144 of body 140. Impeller 104 also includes a plurality of blades 146 that are shown extending between body 140 and shroud 142 in FIG. 1. With reference to FIG. 1, it will be appreciated that blades 146 define a plurality of flow channels 148.

Shroud 142 defines an opening 120 that fluidly communicates with flow channels 148. Impeller 104 of FIG. 1 includes a plurality of inlet partials 106 extending into opening 120 defined by shroud 142. In some useful embodiments of the present invention, inlet partials 106 are capable of supporting shroud 108 in a manner that precludes undesirable changes in the shape of opening 120.

Figure 2:
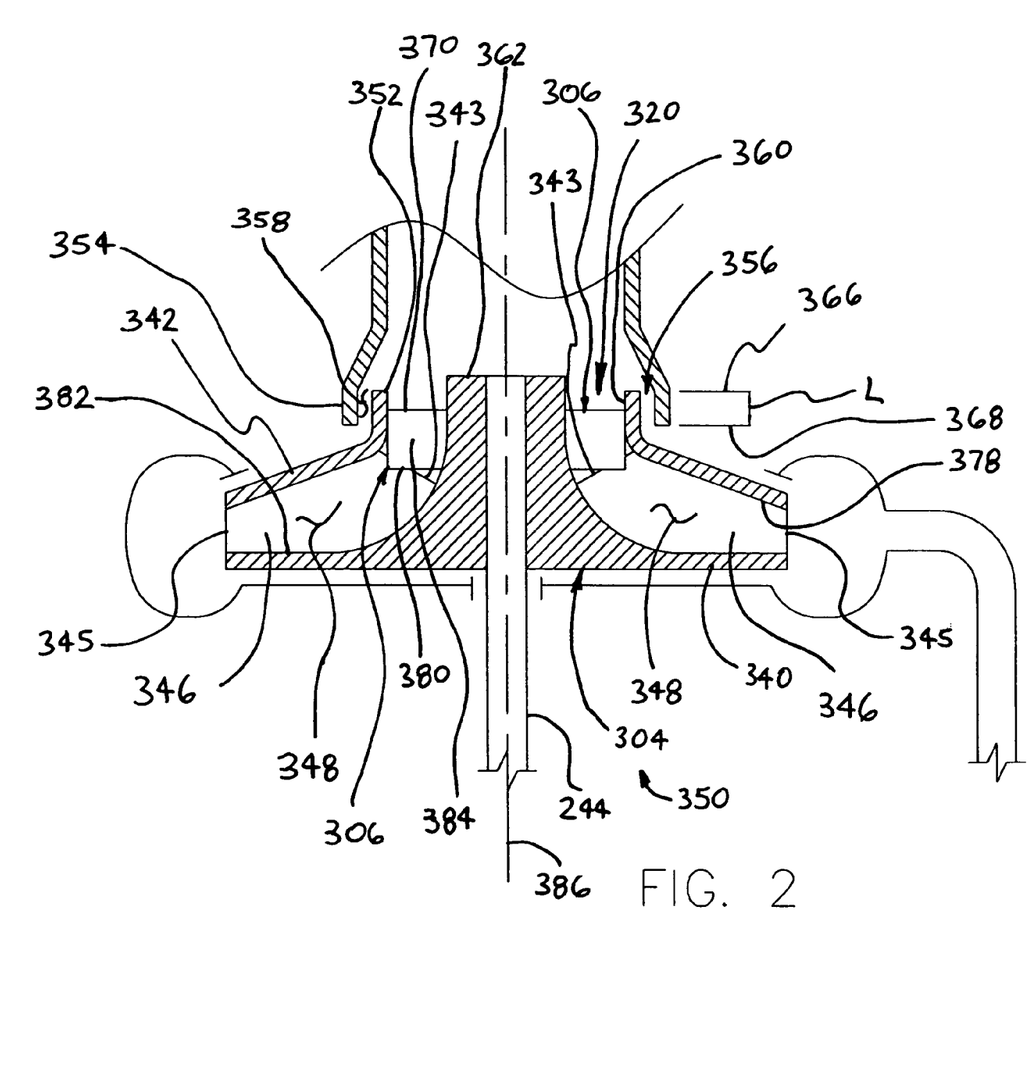
FIG. 2 is a cross sectional view of a turbopump in accordance with an exemplary embodiment of the present invention.

FIG. 2 is a cross sectional view of a pump 350 in accordance with an exemplary embodiment of the present invention. An impeller 304 of pump 350 comprises a body 340, a shroud 342 and a plurality of blades 346 extending between body 340 and shroud 342. Each blade 346 of impeller 304 has a leading edge 343 and a trailing edge 345. Shroud 342 defines an opening 320 fluidly communicating with a plurality of flow channels 348 of impeller 304. In the embodiment of FIG. 2, opening 320 is defined by a first annular ring 352 of shroud 342.

A second annular ring 354 is disposed about first annular ring 352 so that a seal 356 is formed between first annular ring 352 and second annular ring 354 in the embodiment of FIG. 2. In FIG. 2, seal 356 is illustrated using a gap 358 that is shown disposed between first annular ring 352 and second annular ring 354. In some useful embodiments of the present invention, seal 356 comprises a labyrinth seal. With reference to FIG. 2, it will be appreciated that seal 356 has a length L. In FIG. 2, length L is shown extending between a distal end 366 of seal 356 and a proximal end 368 of seal 356. In the embodiment of FIG. 2, distal end 366 of seal 356 is disposed in an upstream location relative to proximal end 368 of seal 356.

With reference to FIG. 2, it will be appreciated that impeller 304 also includes a plurality of inlet partials 306 extending into opening 320 defined by shroud 342. In FIG. 2, inlet partials 306 can be seen extending between an inner surface 360 of first annular ring 352 and a hub 362 of impeller 304. In some useful embodiments of the present invention, inlet partials 306 of impeller 304 are capable of decreasing the radial deformation of first annular ring 352. When this is the case, the dimensions of gap 358 are likely to remain more constant when first annular ring 352 is rotating than would be the case if first annular ring 352 was not reinforced. In some applications, this consistency reduces the likelihood that rubbing will occur between the first ring and the second ring, while at the same time allowing the gap between the first ring and the second ring to be relatively small. A smaller gap provides for less leakage and greater pump efficiency.

In the embodiment of FIG. 2, it will be appreciated that a distal extent 370 of each inlet partial 306 is disposed distally of proximal end 368 of seal 356. The distal extent 370 of each inlet partial 306 is also disposed distally of a proximal surface 378 of shroud 342 in the embodiment of FIG. 2. Each inlet partial 306 also has a proximal extent 380 that is disposed distally of a front surface 382 of body 340 of impeller 304 in the embodiment of FIG. 2. With reference to FIG. 2, it will be appreciated that the proximal extent 380 of each inlet partial 306 is disposed in a spaced apart relationship with front surface 382 of body 340.

In some useful embodiments of the present invention, each inlet partial 306 is capable of directing the flow of a working fluid in a desired direction. In the embodiment of FIG. 2, each inlet partial 306 comprises a flow directing surface 384. In the embodiment of FIG. 2, flow directing surface 384 of each inlet partial 306 is positioned and dimensioned so as to direct a working fluid in a direction that is non-parallel with a rotational axis 386 of impeller 304. Impeller 304 is fixed to a drive shaft 244 so that impeller 304 rotates about rotational axis 386.

Figure 3:
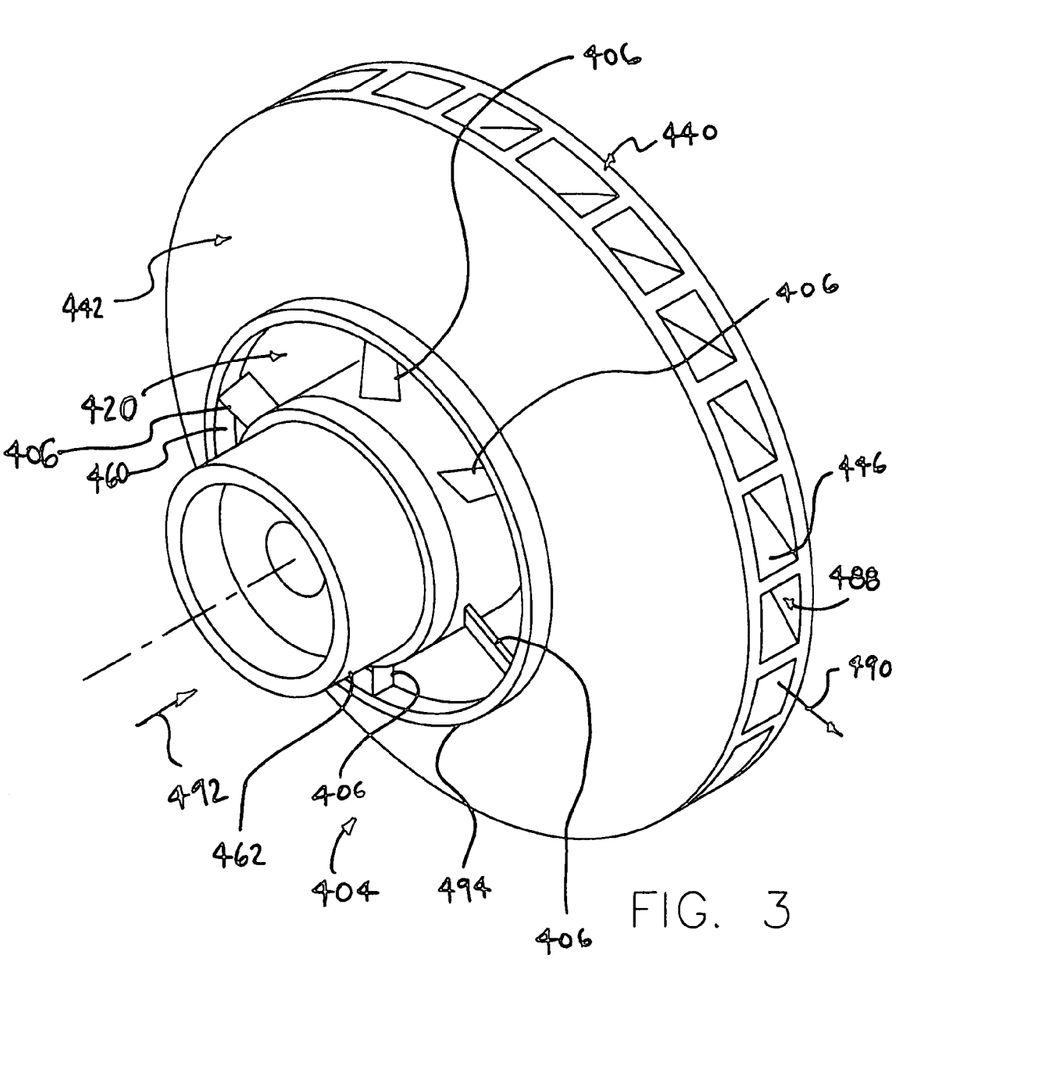
FIG. 3 is a perspective view of an impeller in accordance with an exemplary embodiment of the present invention.

FIG. 3 is a perspective view of an impeller 404 in accordance with an exemplary embodiment of the present invention. Impeller 404 of FIG. 3 comprises a body 440, a shroud 442 and a plurality of blades 446 extending between body 440 and shroud 442. In some embodiments of the present invention body 440, shroud 442 and blades 446 are all formed from a single piece of material.

With reference to FIG. 3, it will be appreciated that body 440, shroud 442 and blades 446 define a plurality of radially disposed outlets 488. Shroud 442 defines an opening 420 that preferably communicates with outlets 488. When this is the case, a working fluid may pass through opening 420 while traveling in an axial direction 492 and may exit outlet 488 while traveling in a radial direction 490.

In the embodiment of FIG. 3, opening 420 is defined by a ring 494 of shroud 442. With reference to FIG. 3, it will be appreciated that impeller 404 also includes a plurality of inlet partials 406 extending into opening 420 defined by shroud 442. In FIG. 3, inlet partials 406 can be seen extending between an inner surface 460 of shroud 442 and a hub 462 of impeller 404.

Figure 4:
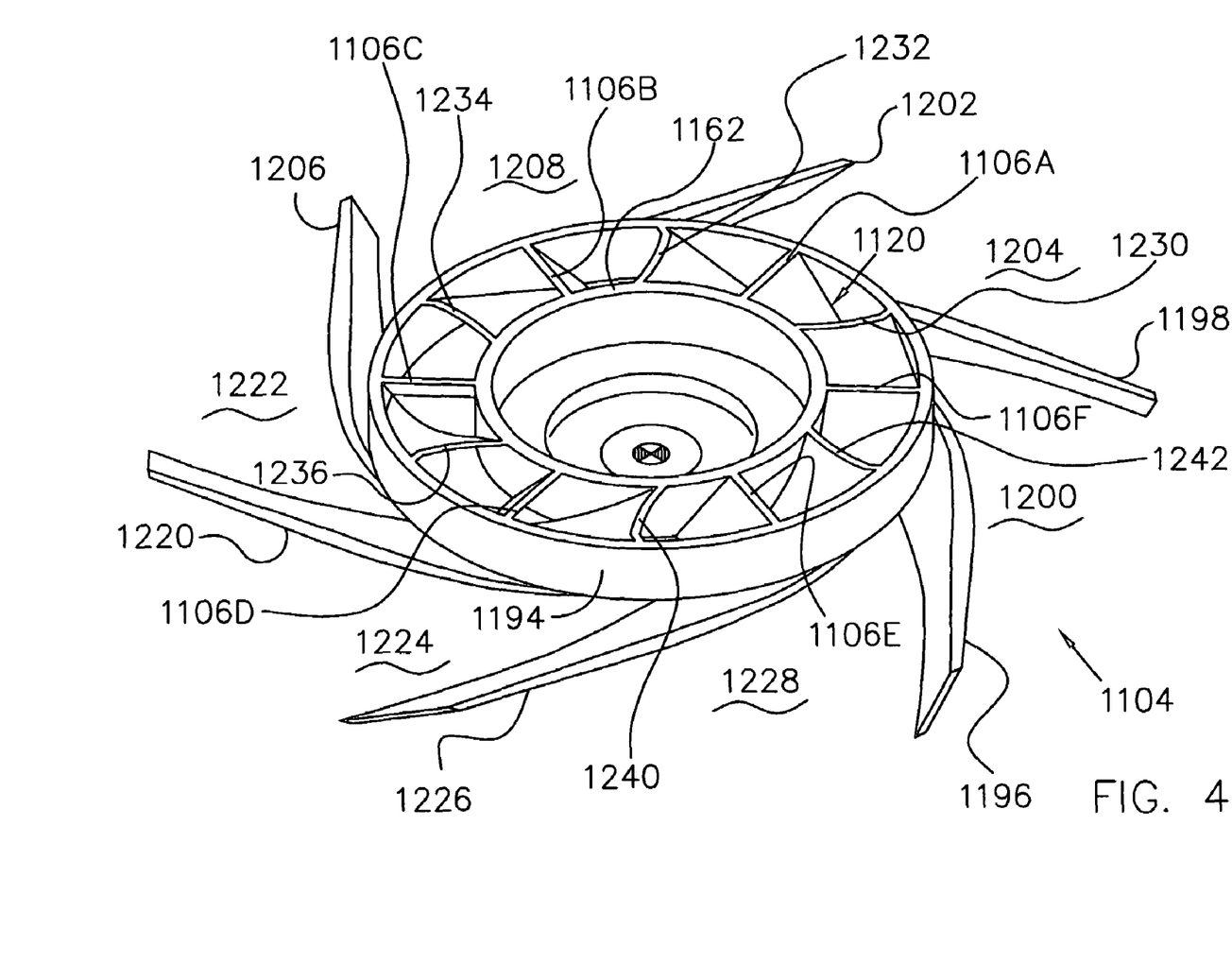
FIG. 4 is an isometric view of an impeller in accordance with an exemplary embodiment of the present invention.

FIG. 4 is an isometric view of an impeller 1104 in accordance with an exemplary embodiment of the present invention. In the embodiment of FIG. 4, impeller 1104 comprises a hub 1162, a ring 1194 and a plurality of blades. Impeller 1104 of FIG. 4 may also comprise a body and a shroud that are not shown in FIG. 4 for purposes of illustration.

With reference to FIG. 4, it will be appreciated that the blades of impeller 1104 define a plurality of flow channels. More particularly, a first blade 1196 and a second blade 1198 of impeller 1104 define a first flow channel 1200. Likewise, second blade 1198 and a third blade 1202 define a second flow channel 1204. Similarly, third blade 1202 and a fourth blade 1206 of impeller 1104 define a third flow channel 1208. With reference to FIG. 4, it will be appreciated that fourth blade 1206 and a fifth blade 1220 of impeller 1104 define a fourth flow channel 1222. A fifth flow channel 1224 is defined by fifth blade 1220 and a sixth blade 1226 of impeller 1104. Finally, sixth blade 1226 and first blade 1196 define a sixth flow channel 1228.

Ring 1194 defines an opening 1120 that communicates with the flow channels of impeller 1104. In the embodiment of FIG. 4, a hub 1162 of impeller 1104 is disposed within opening 1120 of ring 1194. With reference to FIG. 4, it will be appreciated that a plurality of inlet partials 1106 extend between hub 1162 and ring 1194. In some useful embodiments of the present invention, inlet partials 1106 are capable of decreasing the radial deformation of ring 1194.

In the embodiment of FIG. 4, a first inlet partial 1106A is disposed between a first leading edge 1230 of first blade 1196 and a second leading edge 1232 of second blade 1198. Additionally, a second inlet partial 1106B is shown disposed between second leading edge 1232 of second blade 1198 and a third leading edge 1234 of third blade 1202.

In the embodiment of FIG. 4, a third inlet partial 1106C is disposed between third leading edge 1234 of third blade 1202 and a fourth leading edge 1236 of fourth blade 1206. In FIG. 4, a fourth inlet partial 1106D is shown disposed between fourth leading edge 1236 of fourth blade 1206 and a fifth leading edge 1240 of fifth blade 1220. A fifth inlet partial 1106E can also be seen disposed between fifth leading edge 1240 of fifth blade 1220 and a sixth leading edge 1242 of sixth blade 1226 in FIG. 4. Finally, a sixth inlet partial 1106F is disposed between sixth leading edge 1242 of sixth blade 1226 and first leading edge 1230 of first blade 1196.

Although the impeller shown in FIG. 4, comprises six blades and six inlet partials it will be appreciated that this is an exemplary embodiment and that additional configurations are possible without deviating from the spirit and scope of the present invention. For example, impellers having more than six blades or fewer than six blades are possible without deviating from the spirit and scope of the present invention. By way of a second example, impellers having more than six inlet partials or fewer than six inlet partials are possible without deviating from the spirit and scope of the present invention.

Figure 5:
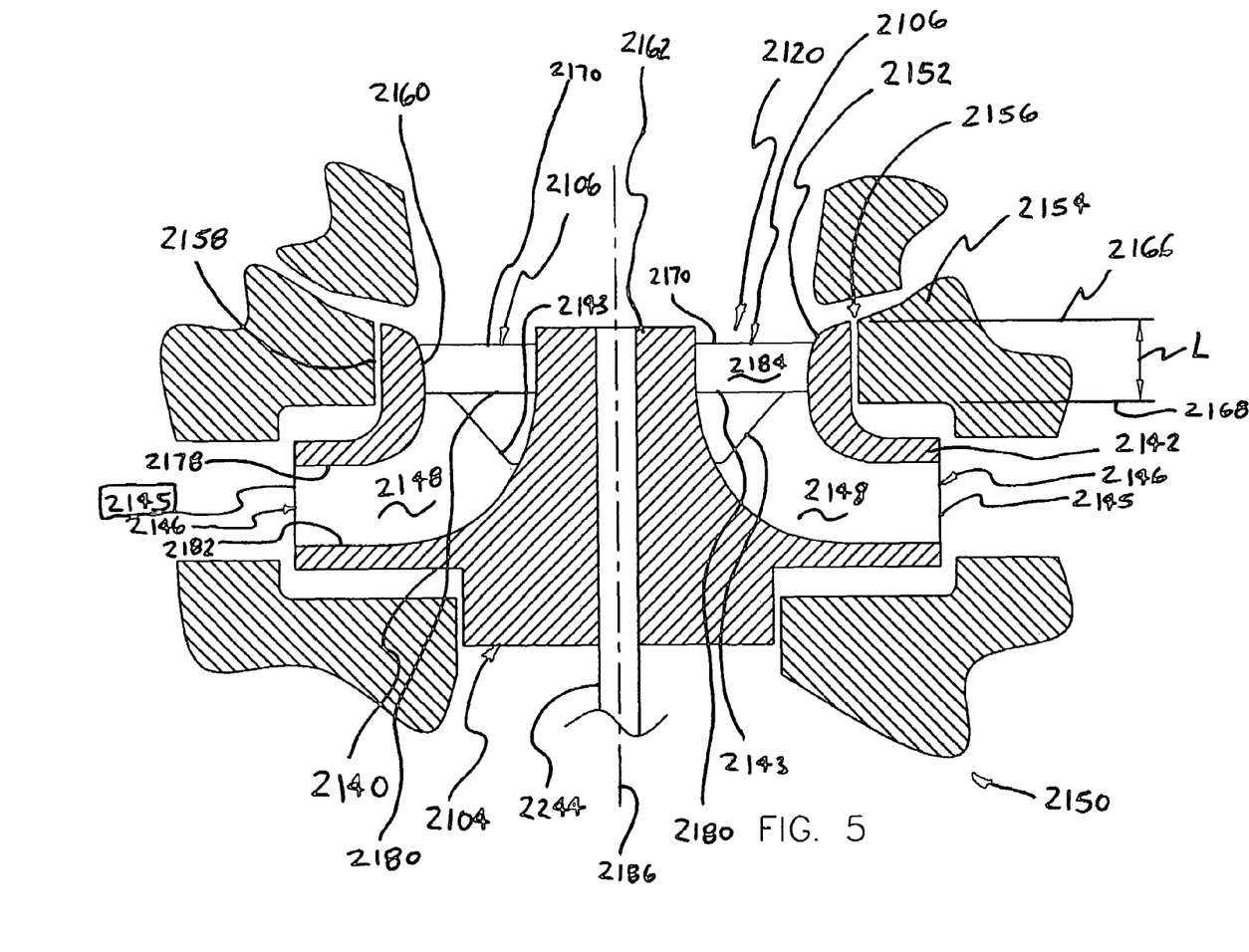
FIG. 5 is a cross sectional view of a turbopump in accordance with an exemplary embodiment of the present invention.

FIG. 5 is a cross sectional view of a pump 2150 in accordance with an exemplary embodiment of the present invention. An impeller 2104 of turbopump 2150 comprises a body 2140, a shroud 2142 and a plurality of blades 2146 extending between body 2140 and shroud 2142. Each blade 2146 of impeller 2104 has a leading edge 2143 and a trailing edge 2145. Shroud 2142 defines an opening 2120 fluidly communicating with a plurality of flow channels 2148 of impeller 2104. In the embodiment of FIG. 5, opening 2120 is defined by a first annular ring 2152 of shroud 2142.

A second annular ring 2154 is disposed about first annular ring 2152 so that a seal 2156 is formed between first annular ring 2152 and second annular ring 2154 in the embodiment of FIG. 5. In FIG. 5, seal 2156 is illustrated using a gap 2158 that is shown disposed between first annular ring 2152 and second annular ring 2154. With reference to FIG. 5, it will be appreciated that seal 2156 has a length L. In FIG. 5, length L is shown extending between a distal end 2166 of seal 2156 and a proximal end 2168 of seal 2156. In the embodiment of FIG. 5, distal end 2166 of seal 2156 is disposed in an upstream location relative to proximal end 2168 of seal 2156. In some useful embodiments of the present invention, seal 2156 comprises a labyrinth seal.

With reference to FIG. 5, it will be appreciated that impeller 2104 also includes a plurality of inlet partials 2106 extending into opening 2120 defined by shroud 2142. In FIG. 5, inlet partials 2106 can be seen extending between an inner surface 2160 of first annular ring 2152 and a hub 2162 of impeller 2104. In some useful embodiments of the present invention, inlet partials 2106 of impeller 2104 are capable of decreasing radial deformation of first annular ring 2152. When this is the case, the dimensions of gap 2158 are likely to remain more constant when first annular ring 2152 is rotating than would be the case if first annular ring 2152 was not reinforced. In some applications, this consistency reduces the likelihood that rubbing will occur between the first ring and the second ring, while at the same time allowing the gap between the first ring and the second ring to be relatively small. A smaller gap provides for less leakage and greater pump efficiency.

In the embodiment of FIG. 5, it will be appreciated that a distal extent 2170 of each inlet partial 2106 is disposed distally of proximal end 2168 of seal 2156. The distal extent 2170 of each inlet partial 2106 is also disposed distally of a proximal surface 2178 of shroud 2142 in the embodiment of FIG. 5. Each inlet partial 2106 also has a proximal extent 2180 that is disposed distally of a front surface 2182 of body 2140 of impeller 2104 in the embodiment of FIG. 5.

In some useful embodiments of the present invention, each inlet partial 2106 is capable of directing the flow of a working fluid in a desired direction. In the embodiment of FIG. 5, each inlet partial 2106 comprises a flow directing surface 2184. In the embodiment of FIG. 5, flow directing surface 2184 of each inlet partial 2106 is positioned and dimensioned so as to direct a working fluid in a direction that is non-parallel with a rotational axis 2186 of impeller 2104. Impeller 2104 is fixed to a drive shaft 2244 so that impeller 2104 rotates about rotational axis 2186.

Figure 6:
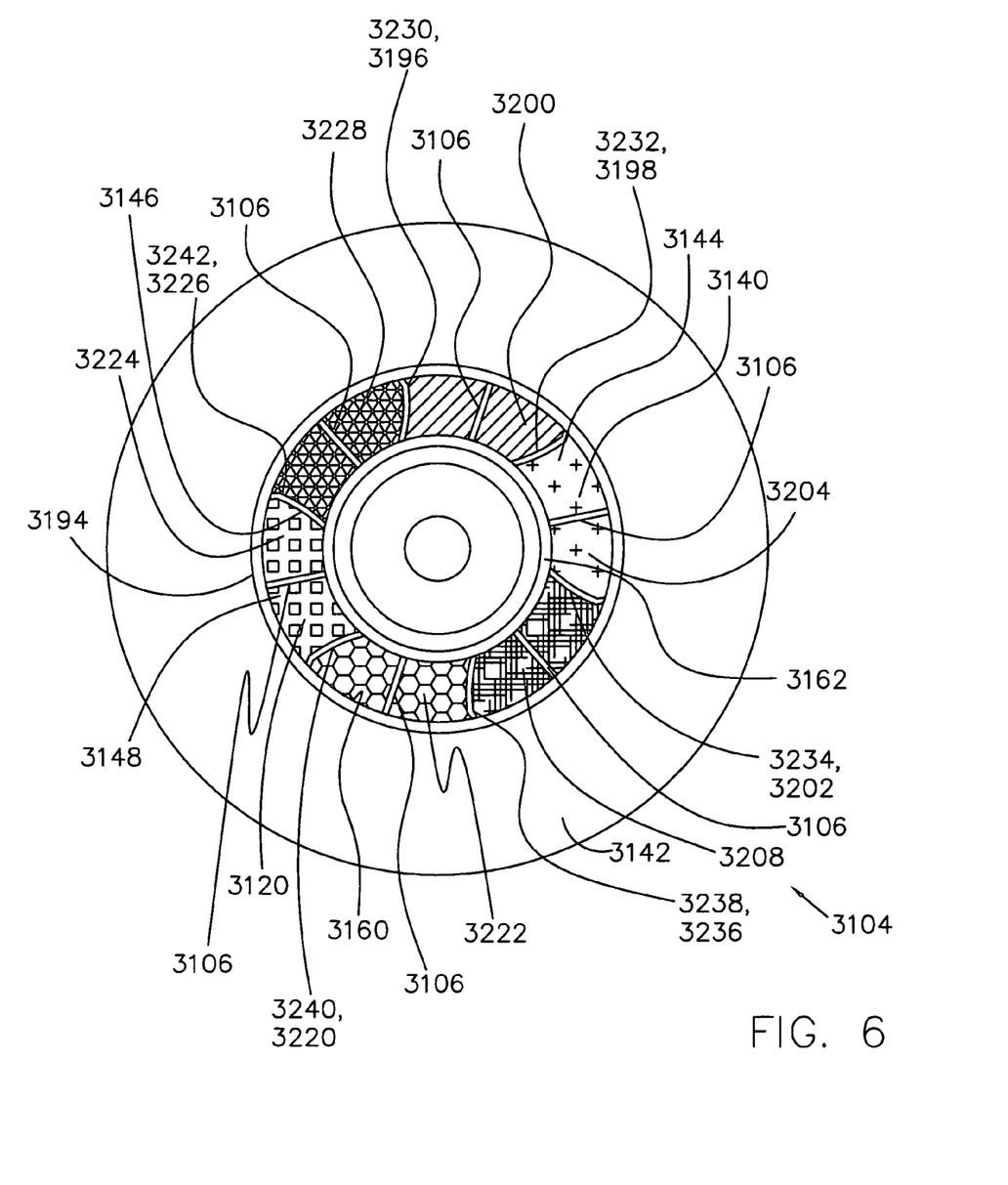
FIG. 6 is an axial view of an impeller in accordance with the present invention.

FIG. 6 is an axial view of an impeller 3104 in accordance with an exemplary embodiment of the present invention. In the embodiment of FIG. 6, a shroud 3142 is shown overlaying a front face 3144 of a body 3140 of impeller 3104. Impeller 3104 includes a plurality of blades 3146 defining a plurality of flow channels 3148. For purposes of illustration, each flow channel of impeller 3104 is filled with a distinctive pattern in FIG. 6.

In the embodiment of FIG. 6, a first flow channel 3200 is shown extending between a first leading edge 3230 of first blade 3196 and a second leading edge 3232 of second blade 3198. Additionally, a second flow channel 3204 is shown extending between second leading edge 3232 of second blade 3198 and a third leading edge 3234 of third blade 3202.

In the embodiment of FIG. 6, a third flow channel 3208 is shown extending between third leading edge 3234 of third blade 3202 and a fourth leading edge 3236 of fourth blade 3238. In FIG. 6, a fourth flow channel 3246 is shown extending between fourth leading edge 3236 of fourth blade 3238 and a fifth leading edge 3240 of fifth blade 3220. A fifth flow channel 3224 can also be seen extending between fifth leading edge 3240 of fifth blade 3220 and a sixth leading edge 3242 of sixth blade 3226 in FIG. 6. Finally, a sixth flow channel 3228 is extending between sixth leading edge 3242 of sixth blade 3226 and first leading edge 3230 of first blade 3196.

Shroud 3142 of FIG. 6 includes a ring 3194 defining an opening 3120. With reference to FIG. 6, it will be appreciated that opening 3120 communicates with first flow channel 3200, second flow channel 3204, third flow channel 3208, fourth flow channel 3246, fifth flow channel 3224 and sixth flow channel 3228.

In FIG. 6, a plurality of inlet partials 3106 are shown extending between an inner surface 3160 of ring 3194 and a hub 3162 of impeller 3104. In some useful embodiments of the present invention, inlet partials 3106 of impeller 3104 are capable of supporting in locations proximate opening 3120. In some useful embodiments of the present invention, the presence of inlet partials 3106 inside opening 3120 reduces the likelihood that undesirable changes in the shape of opening 3120 will occur during operation of a pump including shroud 3142.

Figure 7:
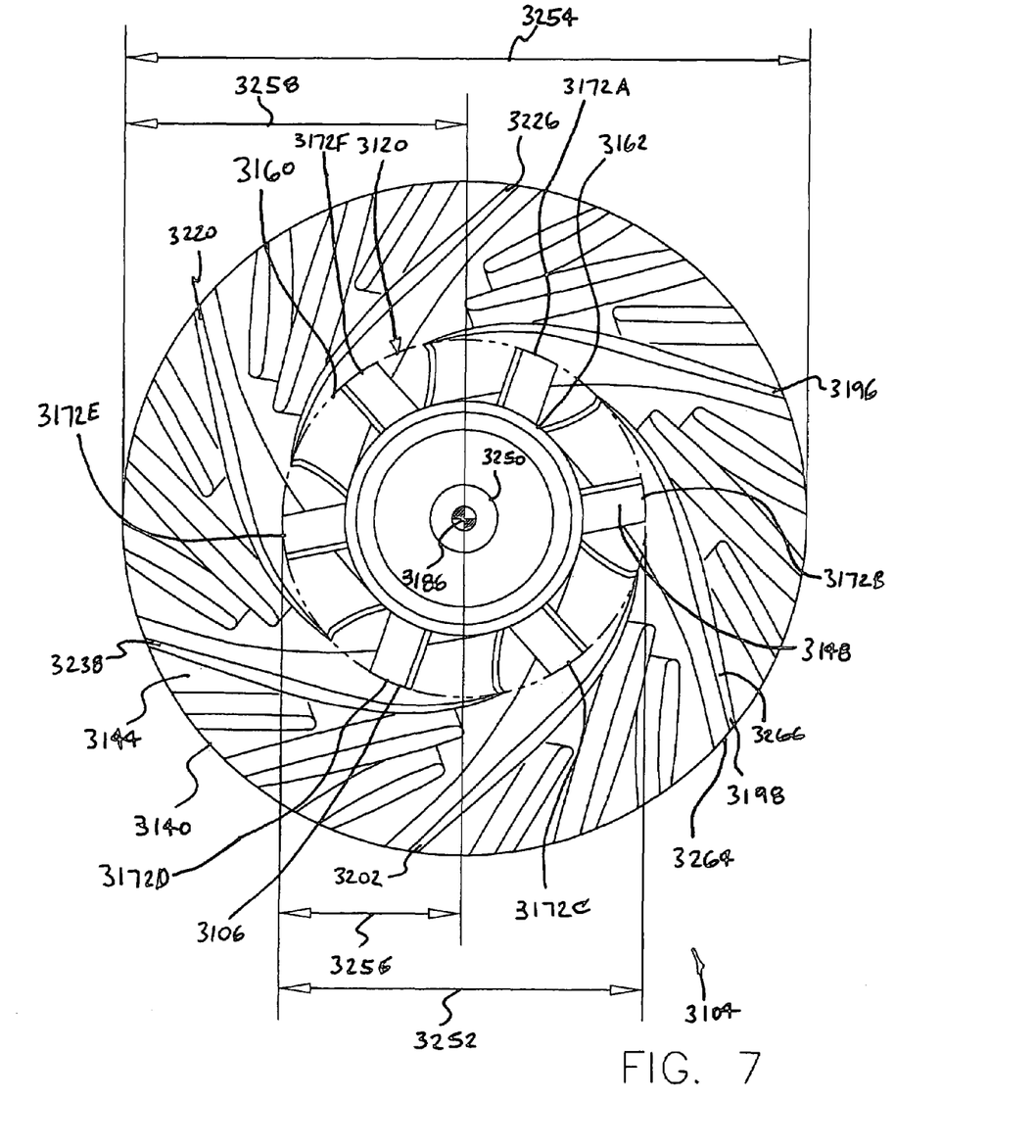
FIG. 7 is an additional axial view of impeller shown in the previous figure.

FIG. 7 is an additional axial view of impeller 3104 shown in the previous figure. In the embodiment of FIG. 7, shroud 3142 of impeller 3104 has been removed so that additional portions of the blades can be seen. Impeller 3104 comprises a hub 3162 defining a bore 3250. Bore 3250 is preferably adapted to receive a drive shaft of a turbopump. A plurality of inlet partials 3106 are shown extending away from bore 3250 in FIG. 7.

In the embodiment of FIG. 7, impeller 3104 includes a first inlet partial 3172A, a second inlet partial 3172B, a third inlet partial 3172C, a fourth inlet partial 3172D, a fifth inlet partial 3172E and a sixth inlet partial 3172F. In some useful embodiments of the present invention, inlet partials 3106 are dimensioned so as to support an opening defined by a shroud that is not shown in FIG. 7. In the embodiment of FIG. 7, each of these inlet partials 3106 extend to an inner surface 3160 defining an opening 3120. Inner surface 3160 is illustrated using a phantom line in FIG. 7.

In the embodiment of FIG. 7, inner surface 3160 defines a cylinder having a first diameter 3252. With reference to FIG. 7, it will be appreciated that body 3140 of impeller 3104 has a second diameter 3254. In the embodiment of FIG. 7, each inlet partial 3106 extends to a first radius 3256 and each blade extends to a second radius 3258. With reference to FIG. 7, it will be appreciated that second radius 3258 is generally larger than first radius 3256.

Impeller 3104 comprises a body 3140 having a front face 3144 and a plurality of blades 3146 extending beyond front face 3144. Front face 3144 of body 3140 may have various shapes without deviating from the spirit and scope of the present invention. For example, front face 3144 may comprise a generally conical surface. By way of a second example, front face 3144 may comprise a generally toroidal surface.

Impeller 3104 of FIG. 7 includes a first blade 3196, a second blade 3198, a third blade 3202, a fourth blade 3238, a fifth blade 3220 and a sixth blade 3226. In the embodiment of FIG. 7, each blade has a somewhat arcuate shape. A leading edge 3262, a trailing edge 3264, and a top edge 3266 of each blade can be seen in FIG. 7.

In the embodiment of FIG. 7, each inlet partial 3106 is disposed between a pair of blades 3146. First inlet partial 3172A, for example, is disposed between first blade 3196 and second blade 3198. Additionally, second inlet partial 3172B is disposed between second blade 3198 and third blade 3202.

In the embodiment of FIG. 7, third inlet partial 3172C is disposed between third blade 3202 and fourth blade 3238. In FIG. 7, fourth inlet partial 3172D is shown disposed between fourth blade 3238 and fifth blade 3220. Fifth inlet partial 3172E can also be seen disposed between fifth blade 3220 and sixth blade 3226 in FIG. 7. Finally, sixth inlet partial 3172F is disposed between sixth blade 3226 and first blade 3196.

In some useful embodiments of the present invention, each inlet partial 3106 is capable of directing the flow of a working fluid in a desired direction. In the embodiment of FIG. 7, each inlet partial 3106 comprises a flow directing surface 3184. In the embodiment of FIG. 7, flow directing surface 3184 of each inlet partial 3106 is positioned and dimensioned so as to direct a working fluid in a direction that is non-parallel with a rotational axis 3186 of impeller 3104.

Although the impeller shown in FIG. 7, comprises six full blades, six inlet partials, six long discharge partials, and 12 short discharge partials it will be appreciated that this is an exemplary embodiment and that additional configurations are possible without deviating from the spirit and scope of the present invention. For example, impellers having more than six blades or fewer than six blades are possible without deviating from the spirit and scope of the present invention. By way of a second example, impellers having more than six inlet partials or fewer than six inlet partials are possible without deviating from the spirit and scope of the present invention.

Figure 8:
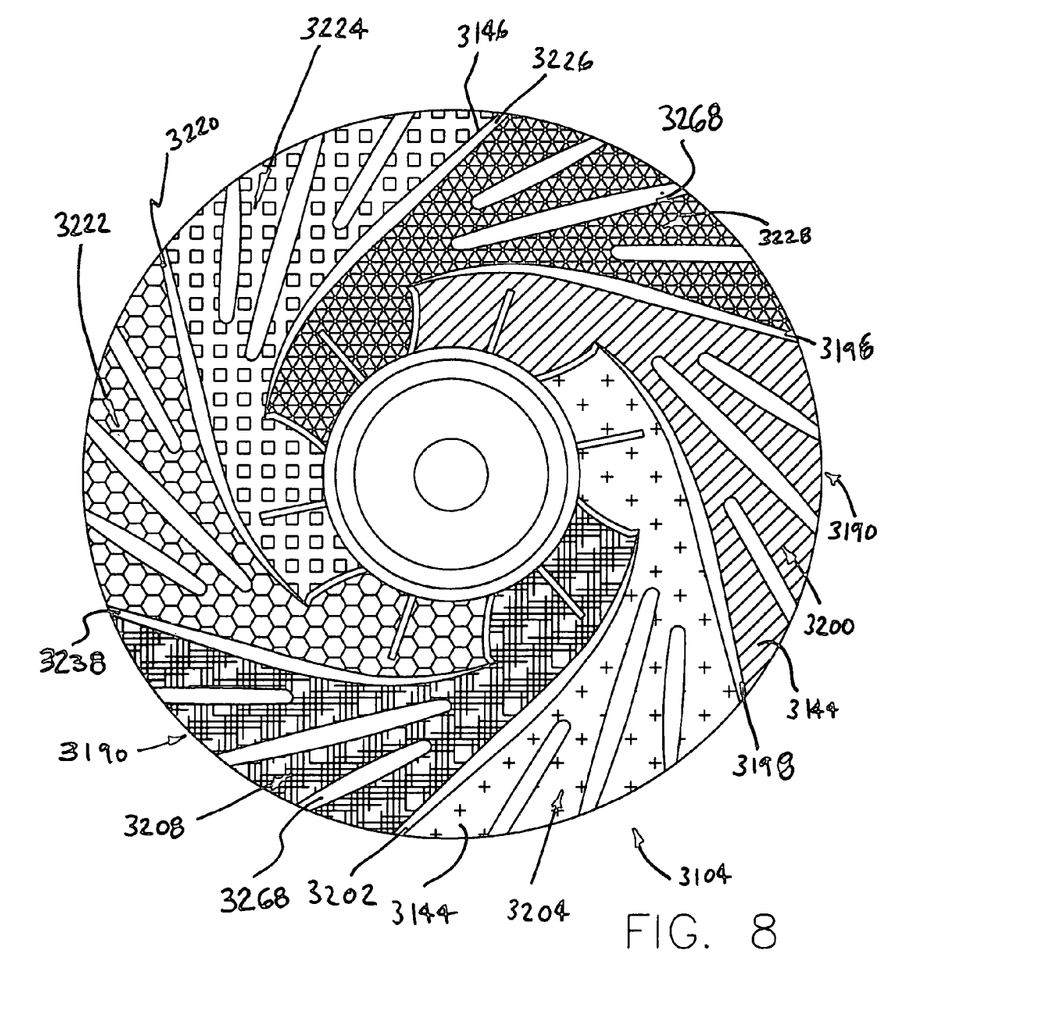
FIG. 8 is an additional axial view of impeller shown in the previous figure.

FIG. 8 is an additional axial view of impeller 3104 shown in the previous figure. With reference to FIG. 8, it will be appreciated that impeller 3104 defines a plurality of flow channels 3148. For purposes of illustration, each flow channel of impeller 3104 is filled with a distinctive pattern in FIG. 8. The patterns filling each flow channel may represent, for example, a working fluid that is being conveyed by impeller 3104. First blade 3196, second blade 3198 and front face 3144 define a first flow channel 3200 that is filled with hatch lines in FIG. 8. Likewise, second blade 3198 third blade 3202, and front face 3144 of body 3140 define a second flow channel 3204 that is filled with a pattern of "+" symbols. Similarly, third blade 3202, fourth blade 3238 and front face 3144 define a third flow channel 3208 that is filled with a houndstooth pattern.

With reference to FIG. 8, it will be appreciated that fourth blade 3238, fifth blade 3220 and front face 3144 define a fourth flow channel 3222 that is filled with a honeycomb pattern. A fifth flow channel 3224 is defined by fifth blade 3220, sixth blade 3226 and front face 3144. In FIG. 8, fifth flow channel 3224 is filled with a pattern of squares. Finally, sixth blade 3226, first blade 3196 and front face 3144 define a sixth flow channel 3228 that is filled with a pattern of triangles in FIG. 8.

Impeller 3104 of FIG. 8 also includes a plurality of splitters 3268 extending beyond front face 3144 of body 3140. Impeller 3104 comprises a plurality of outlets 3190 disposed between the trailing portions of splitters 3268 and the trailing portions of blades 3146.

Figure 9:
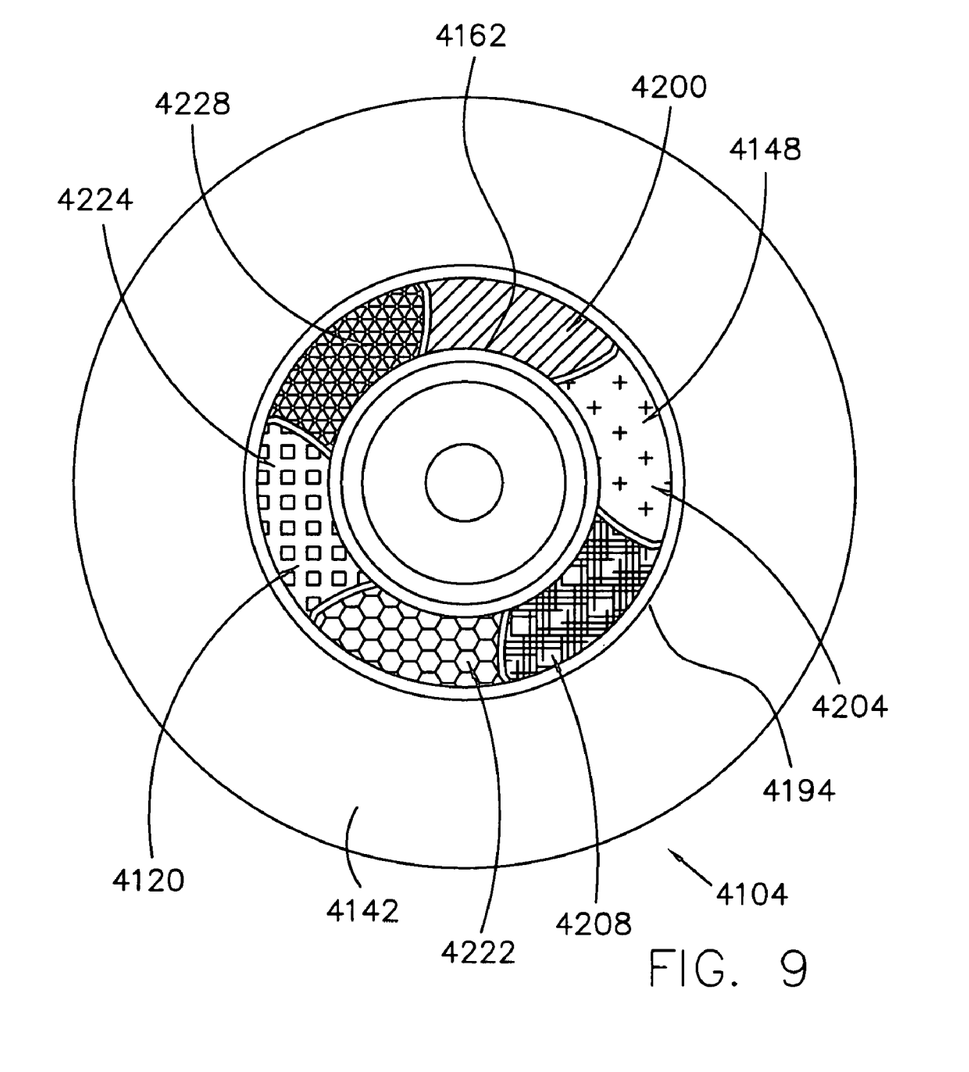
FIG. 9 is an axial view of an impeller comprising a hub and a shroud.

FIG. 9 is an axial view of an impeller 4104 comprising a hub 4162 and a shroud 4142. With reference to FIG. 9, it will be appreciated that impeller 4104 does not include inlet partials like those shown in the previous figure. Impeller 4104 includes a first blade 4196, a second blade 4198, a third blade 4202, a fourth blade 4238, a fifth blade 4220, and a sixth blade 4226. With reference to FIG. 9, it will be appreciated that impeller 4104 defines a plurality of flow channels 4148. For purposes of illustration, each flow channel of impeller 4104 is filled with a distinctive pattern in FIG. 9. More particularly, a first flow channel 4200, a second flow channel 4204, and a third flow channel 4208 of impeller 4104 are filled with hatch lines, "+" symbols, and a houndstooth pattern, respectively. The patterns filling each flow channel may represent, for example, a working fluid that is being conveyed by impeller 4104. In FIG. 9, a fourth flow channel 4222, a fifth flow channel 4224, and a sixth flow channel of impeller 4104 are filled with a honeycomb pattern, a pattern of squares, and a pattern of triangles, respectively.

Shroud 4142 of FIG. 9 includes a ring 4194 defining an opening 4120. With reference to FIG. 9, it will be appreciated that opening 4120 communicates with first flow channel 4200, second flow channel 4204, third flow channel 4208, fourth flow channel 4246, fifth flow channel 4224 and sixth flow channel 4228. In the embodiment of FIG. 9, shroud 4142 is shown in a relaxed state in which opening 4120 has a generally circular shape. As impeller 4104 rotates, deformation forces may act on shroud 4142. During operation of a pump including impeller 4104, forces may act on shroud 4142 so as to cause shroud 4142 to assume a radially deflected shape. For example, shroud 4142 may assume a radially deflected shape when it is rotated at high speed.

Figure 10:
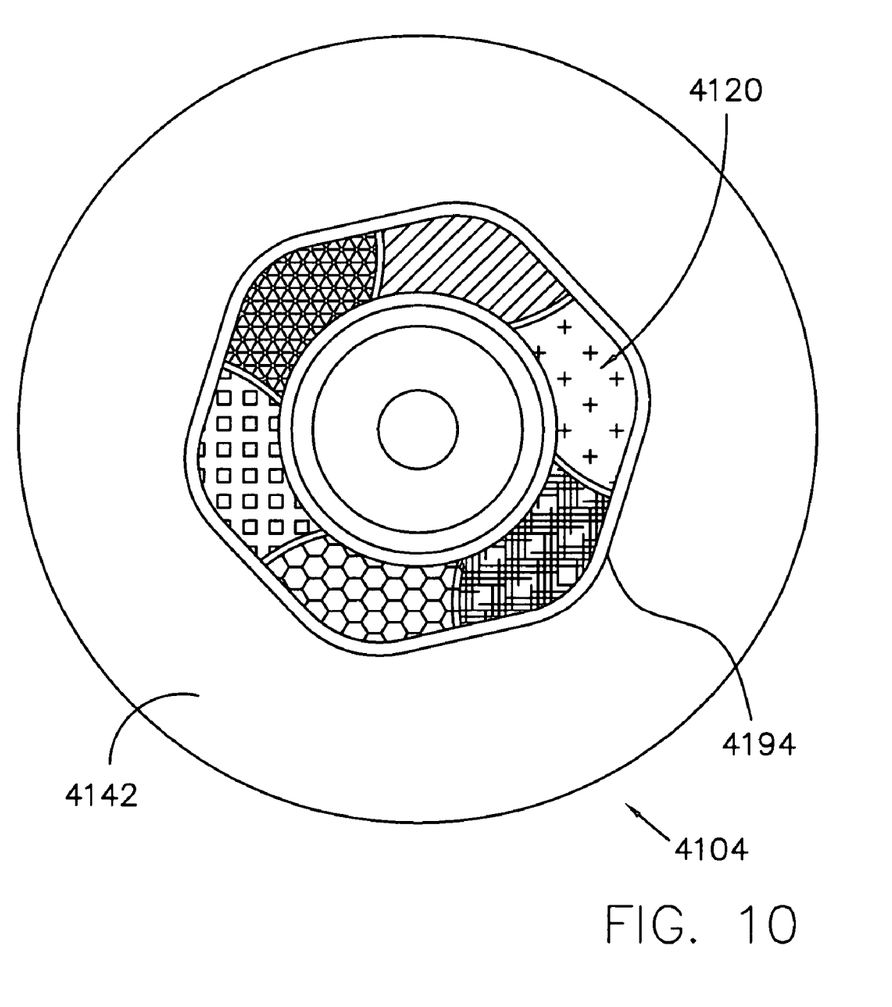
FIG. 10 is an additional axial view of assembly shown in the previous figure.

FIG. 10 is an additional axial view of impeller 4104 shown in the previous figure. In FIG. 10, shroud 4142 is shown in a radially deflect state in which opening 4120 has a second, deflected shape. In the exemplary embodiment of FIG. 10, opening 4120 of shroud 4142 is shown having a shape that may be generally described as a hexagon having a plurality rounded corners. The state of shroud 4142 depicted in FIG. 10 may be generally referred to as a scalloped state. Various forces may act on shroud 4142 may cause scalloping. For example, centrifugal forces acting on the mass of the shroud when it is rotating. The level of scalloping depicted in FIG. 10 has been exaggerated for purposes of illustration. Shroud 4142 of FIG. 10 opening 4120 is defined by ring 4194.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

The invention claimed is:

1. An impeller, comprising:
    a body, a shroud, and a plurality of blades extending therebetween;
    the blades defining at least one flow channel;
    the shroud defining an opening communicating with the at least one flow channel; and
    at least one inlet partial extending into the opening defined by the shroud, wherein the at least one inlet partial is capable of directing a working fluid in a direction that is not parallel to a rotational axis of the impeller.

2. The impeller of claim 1, wherein the opening is defined by an annular ring of the shroud.

3. The impeller of claim 2, wherein the at least one inlet partial is capable of decreasing the radial deformation of the annular ring.

4. The impeller of claim 1, wherein the at least one inlet partial is capable of supporting the opening defined by the shroud.

5. The impeller of claim 1, wherein the at least one inlet partial is capable of precluding a change of shape in the opening during rotation of the shroud.

6. The impeller of claim 5, wherein the change of shape is urged by a centrifugal force acting on the shroud during rotation of the shroud.

7. The impeller of claim 1, wherein the at least one inlet partial has a distal extent that is disposed distally of a proximal surface of the shroud.

8. The impeller of claim 1, wherein the at least one inlet partial has a distal extent that is disposed distally of a proximal surface of a proximal end of a seal formed between the impeller and a casing.

9. The impeller of claim 1, wherein the at least one inlet partial has a proximal extent that is disposed distally of a front face of a body of the impeller.

10. The impeller of claim 1, wherein the impeller comprises a plurality of inlet partials.

11. The impeller of claim 1, wherein the inlet partials are capable of providing supporting forces that are substantially equal and opposite to deformation forces acting on the shroud.

12. The impeller of claim 1, wherein the inlet partials are capable of preventing the opening from assuming a substantially non-circular shape.

13. The impeller of claim 1, wherein a deflection of the shroud during rotation of the shroud is smaller than a deflection occurring in a similar shroud that is not supported by the inlet partials.

14. The impeller of claim 1, wherein the opening defined by the shroud has a first shape when the shroud is stationary and a second shape when the shroud is rotating at a working speed.

15. The impeller of claim 14, wherein a difference between the first shape and the second shape is smaller than a difference in shape occurring when the shroud is not supported by the inlet partials.

16. The impeller of claim 14, wherein the first shape is a generally cylindrical shape.

17. The impeller of claim 14, wherein the inlet partials cause the second shape to be more cylindrical than would be the case without the reinforcements.

18. The impeller of claim 1, wherein each inlet partial extends to a first radius and each blade extends to a second radius that is different from the first radius.

19. The impeller of claim 18, wherein the second radius is greater than the first radius.

20. The impeller of claim 1, wherein each inlet partial is disposed between a pair of blades.

21. An impeller, comprising:
    a shroud defining an opening;
    a hub extending into the opening defined by the shroud;
    a body;
    a plurality of blades extending between the shroud and the body; and
    a plurality of inlet partials extending between the hub and the shroud wherein each inlet partial is disposed between a pair of blades.

22. The impeller of claim 21, wherein the blades define a plurality of flow channels that communicate with the opening defined by the shroud.

23. The impeller of claim 21, wherein the inlet partials are capable of precluding a change of shape in the opening during rotation of the shroud.

24. The impeller of claim 23, wherein the change of shape is ureged by a centrifugal force acting on the shroud during rotation of the shroud.

25. The impeller of claim 21, wherein the inlet partials are capable of providing supporting forces that are equal and opposite deformation forces acting on the shroud.

26. The impeller of claim 25, wherein the deformation forces are centrifugal forces acting on the shroud during rotation of the shroud.

27. An impeller, comprising:
    a body, a shroud, and a plurality of blades extending therebetween;
    the blades at least one flow channel;
    the shroud defining an communicating with the at least one flow channel; and
    a plurality of inlet partials extending into the opening defined by the shroud, wherein each inlet partial is disposed between a pair of blades.

28. The impeller of claim 27, wherein each inlet partial is capable of directing a working fluid in a direction that is not parallel to a rotational axis of the impeller.

29. The impeller of claim 27, wherein each inlet partial extends to a first radius and each blade extends to a second radius that is different from the first radius.

30. The impeller of claim 29, wherein the second radius is greater than the first radius.

* * * * *